(12) United States Patent
Goldman et al.

(10) Patent No.: US 7,870,168 B2
(45) Date of Patent: Jan. 11, 2011

(54) SYSTEM AND METHOD FOR LOCATING A DOCUMENT CONTAINING A SELECTED NUMBER AND DISPLAYING THE NUMBER AS IT APPEARS IN THE DOCUMENT

(75) Inventors: Neal D. Goldman, New York, NY (US); William Murphy, New York, NY (US)

(73) Assignee: Capital IQ, Inc., New York, NY (US)

( * ) Notice: Subject to any disclaimer, the term of this patent is extended or adjusted under 35 U.S.C. 154(b) by 0 days.

(21) Appl. No.: 12/837,991

(22) Filed: Jul. 16, 2010

(65) Prior Publication Data

US 2010/0280972 A1    Nov. 4, 2010

Related U.S. Application Data

(63) Continuation of application No. 11/407,999, filed on Apr. 21, 2006, which is a continuation of application No. 10/157,582, filed on May 29, 2002, now Pat. No. 7,089,229.

(51) Int. Cl.
*G06F 7/00* (2006.01)
*G06F 17/30* (2006.01)
(52) U.S. Cl. ................................. 707/804
(58) Field of Classification Search ............ 707/3, 707/104.1, 804; 705/1
See application file for complete search history.

(56) References Cited

U.S. PATENT DOCUMENTS

| | | | |
|---|---|---|---|
| 2003/0149578 A1* | 8/2003 | Wong | 705/1 |
| 2003/0220835 A1* | 11/2003 | Barnes, Jr. | 705/14 |
| 2004/0181771 A1* | 9/2004 | Anonsen et al. | 717/100 |

OTHER PUBLICATIONS

Oracle® Purchasing, User's Guide, Release 11, Mar. 1998 (has been provided in parent application).*
Unknown, "Oracle® Purchasing User's Guide, Release II," (Mar. 1998).

* cited by examiner

*Primary Examiner*—Kuen S Lu
(74) *Attorney, Agent, or Firm*—Rothwell, Figg, Ernst & Manbeck PC

(57) ABSTRACT

The disclosure describes a system and method for locating a number in a source document by presenting and manipulating data on private and public companies. A central database of financial information is established. A target entity is entered within the central database by a user, and financial information of the target entity from the central database is displayed. Once a number within the display of financial information is selected, the system and method determines which document is the source document containing the numbers, searches through the source document for the number, identifies the location of the number in the source document and highlights and displays the number as it appears in the source document to the user.

22 Claims, 2 Drawing Sheets

Company: Target Entity

| Net Debt | = | X |
|---|---|---|
| Revenue | = | D |
| EBIDTA | = | K |
| EBIT | = | L |
| EPS | = | M |
| Book Value | = | N |

Figure 1

Net Debt = X: Calculation

| Debt | | Z |
|---|---|---|
| Cash and Equivalents | - | Y |
| Net Debt | | X |

Figure 2

Revenue = D: Calculation

| First Component 1 | | E |
|---|---|---|
| First Component 2 | + | F |
| Revenue | | D |

Figure 3

First Component 1 = E: Calculation

| Second Component 1 | | G |
|---|---|---|
| Second Component 2 | + | H |
| First Component 1 | | E |

Figure 4

| Second Component 1 = G: Calculation | | |
|---|---|---|
| Third Component 1 | | I |
| Third Component 2 | + | J |
| Second Component 1 | | G |

Figure 5

SYSTEM AND METHOD FOR LOCATING A DOCUMENT CONTAINING A SELECTED NUMBER AND DISPLAYING THE NUMBER AS IT APPEARS IN THE DOCUMENT

CROSS REFERENCE TO RELATED APPLICATIONS

This application is a continuation application claiming priority under 35 U.S.C. §120 of U.S. application Ser. No. 11/407,999, filed Apr. 21, 2006, now U.S. Pat. No. 7,761,482, which is a continuation of U.S. application Ser. No. 10/157,582, filed May 29, 2002, now U.S. Pat. No. 7,089,229.

BACKGROUND OF THE INVENTION

The display of financial information by data providers to local users through web-based applications is well-known and commonplace in the finance industries. In addition to the display of financial numbers on a graphical user interface, existing technology provides users with the opportunity of viewing how a specific number is derived. This is accomplished by allowing the user to click on or select any number using a pointing device such as a mouse. Once a chosen number having a hyperlink is clicked on, a window appears that shows the component numbers used to calculate the chosen number, and the method used, such as the addition, subtraction, multiplication, etc., of the component numbers.

A highly desired system and method shows a user where the chosen number that was clicked on appears within a financial document. However, current methods accomplish this through the tedious and time-consuming method of manual "tagging." This process consists of endless hours of searching through thousands of documents to locate the number within a source document and then tagging the actual source of the numbers. When a search is conducted, only the tagged numbers that conform to the search request are identified.

The system and method for locating a number in a document avoids the manual "tagging" of source documents. The invention achieves the goal of finding a specific number in a source document quickly and efficiently, unlike any other method previously employed. It utilizes a central database of information and presents the desired financial numbers to the user within minutes. Once a specific number is clicked on, the invention rapidly searches for the source document containing the number and presents the source document containing the specific number to the user. It achieves this through the use of a computer code and basic algorithms.

The present invention tracks the thinking process of investment bankers regarding financial numbers, and allows a banker to review the reliability of financial information by tracing a number back to its original source. The process of confirming financials that may have taken a banker hours and hours to complete may now be achieved in just minutes.

The invention is currently offered in an ASP model (via the Internet) and is bundled with the central database provider's platform. It could easily be provided as a "behind the firewall" software solution, as a stand-alone product or it may be bundled with other services.

SUMMARY

It is a goal of the present invention to provide a quick and easy system and method for individuals such as investment bankers to locate numbers in financial documents. The invention accomplishes this by presenting and manipulating data on private and public companies. This data includes financial information on public companies. The first step involves identifying the document that will contain a specific chosen number. Once the source document is identified, the invention searches through the source document to locate and identify the specific number. Since a number is not always represented in a single form, the invention takes into consideration all of the different ways a number may be represented in a document.

When a user views a particular public company's financial information within a platform, the user can click on any of the financial numbers (such as dollar values, ratios and multiples) that are initially presented, or target numbers or component numbers presented after the initially presented number is clicked-on. The invention searches for the document which could contain the number, target number or component number that the user has clicked on. Once it finds that document, it locates the number, target number or component number and presents it to the user as it appears in the document.

BRIEF DESCRIPTION OF THE DRAWINGS

FIG. 1 illustrates a window showing a financial profile for a target entity;

FIG. 2 illustrates a window showing component numbers used to calculate a number listed in the profile shown in the window illustrated in FIG. 1;

FIG. 3 illustrates a window showing first component numbers used to calculate a number listed in the profile shown in the window illustrated in FIG. 1;

FIG. 4 illustrates a window showing second component numbers used to calculate a first component number listed in the window illustrated in FIG. 3; and FIG. 5 illustrates a window showing third component numbers used to calculate a second component number listed in the window illustrated in FIG. 4.

DETAILED DESCRIPTION OF THE PREFERRED EMBODIMENTS

According to one preferred embodiment of the present invention, there is provided a method for locating a number in a document. The present invention searches through a database comprising a collection of financial information and documents until it locates the document that contains a specified number, and it then presents the highlighted number as it appears in the document to the user.

A central database of a plurality of data on public and private companies is initially established. Such data includes, without limitation, a robust collection of financial information on public companies. This financial information includes financial categories that are well known in the art, such as a company's Net Debt, Revenue, EBIDTA (earnings before interest, depreciation, taxes and interest), EBIT (earnings before interest and taxes), EPS (earnings per share) and Book Value. (See FIG. 1) This central database is constantly maintained by a host entity. This involves maintaining the central database on computer servers at a secure hosting facility, such as Qwest or Globix.

In a preferred embodiment of the invention, a user initially enters a target entity within the central database through the user interface, and is provided with that target entity's company profile. When a user wishes to obtain a quick comparative financial analysis of the target entity and all of its competitors, the user clicks on a "Quick Comps" hyperlink. The user may then click on any of the presented financial numbers containing a hyperlink for the target entity or any of its competing companies, such as a competing company's Revenue.

When a number is clicked on by the user, the invention searches through the database of financial documents to locate the document which contains that clicked-on number. This document is referred to as the "source document." The source document may be a press release, an SEC filing including, but not limited to, a 10K or 10Q filing, or any other relevant filing. The system and method accomplishes this by searching for a source document that has a date that falls within a certain predetermined date range. The range is determined by the host entity or the computer programmer. This date range is a time period surrounding the target's or competing company's filing date for the source document containing the clicked-on number. This predetermined date range may extend before and after an entity's filing date, only before an entity's filing date, or only after an entity's filing date.

In another preferred embodiment, the invention searches for filings that have a date that falls within thirty days of the end of the three month quarter for which the source document containing the particular number is filed by the target entity or competing company. The invention then selects the most recent of these filings as the source document.

Once the source document containing the clicked-on number is identified, the invention searches through the source document to pinpoint its exact location through the use of a simple algorithm. The algorithm performs a "find" functionality which is well known in the art. The invention first attempts to locate the number in its exact form, or the identical form presented to the user. For example, if the clicked on number is 5 million dollars, it searches for it as "$5,000,000." The difficulty in pinpointing the exact number stems from the fact that a number may be presented in various ways. As such, the number $5,000,000 can be represented as 5,000 (number in thousands), as 5.0 (number in millions) or 5.000.000 (number in European format). If the invention cannot locate $5,000,000, it creates alternative number representations for that number such as 5,000,000, 5,000, 5.0 and 5.000.000. Thus, if it does not locate $5,000,000, it searches for 5,000, 000. If it does not locate 5,000,000, it searches for 5,000. It continues to search through all the different alternative representations until a match is found. The number is then highlighted and displayed to the user, as it appears in the source document.

When the invention fails to locate a source document containing the clicked-on number or clicked-on target number (a target number is any other number that presents itself to the user after the initial number is clicked), it creates a series of alternative number representations for that number or target number. These alternative number representations include but are not limited to numerical digits representing billions, millions, thousands, hundreds, numbers with or without a "$" sign, numbers with or without commas between the digits, numbers with or without periods between the digits, and numbers with or without spaces before and/or after the number. In a preferred embodiment, these representations are created by the host entity or by computer programmers. A specific ranking is assigned to these alternative number representations, and the invention follows this chosen hierarchy. For example, the invention might be programmed to search for a number in the thousands first, in the millions second, with commas third, without commas fourth, with a "$" sign fifth and without a "$" sign sixth. Any amount of alternative number representations may be created, in any order.

In another preferred embodiment, when a number is clicked on by a user, a window appears showing how the number was calculated. This is in contrast to the commencement of an immediate search for the clicked-on number when no window shows itself or pops up. The window displays the "component numbers" used to calculate the clicked-on number. For example, if the clicked-on number was C, then the window would show A+B=C. A and B would be the component numbers that were added to get C. The calculations include, but are not limited to addition, subtraction and multiplication of component numbers. Moreover, component numbers are not limited in amount. There may be two, three, four, etc. component numbers.

By way of example, if the user clicks on the "Net Debt" number X (see FIG. 1) for a company, a window appears, as shown in FIG. 2, which shows that the Net Debt was calculated by subtracting the company's "Cash and Equivalents" (number Y) from its "Debt" (number Z). Thus, the window would show that the first component numbers Y and Z were subtracted to get the number X.

In another preferred embodiment, a window appears more than once. If the number D (as shown in FIG. 1) was clicked on by the user, a window showing E+F=D would appear (See FIG. 3). If the user clicked on one of the first component numbers, E or F, a second window could appear showing how E or F, respectively, were calculated. For example, the window would show G+H=E if the number E was clicked on, G and H would be the second component numbers that were added to get E (See FIG. 4). If the user clicked on one of the second component numbers, G or H, a third window could appear showing how G or H, respectively, were calculated. For example, the window would show I+J=G if the number G were clicked on (See FIG. 5).

In a preferred embodiment, all of the component numbers (first, second, third, etc.), including the calculations involving the component numbers could be displayed in a single window. A single window would thus show, in a flow-chart or tree-like fashion, a path beginning with the first number clicked on by the user up to the final component number.

The invention continues to provide the user with windows displaying component numbers until it reaches a point where a final component number stands alone. The first step of this system and method is determining which document is the one that contains that final component number (which maybe the first, second, third, etc. component number). It does this by searching for the source documents (an SEC 10K or 10Q filing, press release, or any other document that may contain the component number entered in or accessible in the database) that have dates that fall within a predetermined date range surrounding a company's filing date for the source document containing the component number. If more than one source document is found, the invention uses a simple algorithm that is well known in the art to select the document with the most recent date (or the most recent filing date).

The second step involves locating the exact number in the source document. If the source document containing the exact number as it is presented to the user is found, it is highlighted and presented to the user as it appears in the source document. If the exact number is not found, the invention creates a series of alternative number representations. It then proceeds to go through the series of alternative number representations in a predetermined hierarchical fashion until a representation is found. It then highlights the number representation and presents it to the user as it appears in the source document.

In another preferred embodiment of the invention, all of the alternative number representations are highlighted and presented to the user as they appear in their respective documents. The user may then view all of the highlighted numbers and determine which are the most useful and/or appropriate.

The invention claimed is:

1. A computer-readable medium having encoded thereon computer-executable instructions which, when executed by a computer, cause the computer to perform a process comprising the steps of:
   (a) receiving a user selection of a target entity about which the user wishes to view financial information;
   (b) retrieving financial information of the target entity from a computer-stored database of financial information;
   (c) displaying the retrieved financial information of the target entity;
   (d) receiving a user selection of a number within the displayed financial information;
   (e) searching through the database to locate a source document containing the selected number; and
   (f) displaying a portion of the source document containing the selected number.

2. A computer-readable medium having encoded thereon computer-executable instructions which, when executed by a computer, cause the computer to perform a process comprising the steps of:
   (a) receiving a user selection of a target entity about which the user wishes to view financial information;
   (b) retrieving financial information of the target entity from a computer-stored database of financial information;
   (c) displaying the retrieved financial information of the target entity;
   (d) receiving a user selection of a number within the displayed financial information;
   (e) retrieving from the database one or more component numbers used to calculate the selected number, and displaying the component numbers;
   (f) receiving a user selection of one of the component numbers;
   (g) repeating steps (e) and (f) until the number selected by the user is a number contained in a source document and not calculated from two or more component numbers;
   (h) searching through the database to locate a source document containing the selected number; and
   (i) displaying a portion of the source document containing the selected number.

3. The computer-readable medium of either of claims 1 or 2, having stored thereon instructions for performing the step of searching through the database to locate a source document containing the selected number which, when executed by the computer, cause the computer to:
   generate one or more alternative number representations for the selected number when no source document containing the selected number is found;
   search through the database to locate a source document containing at least one of the alternative number representations; and
   stop the search when a source document containing a one of the alternative number representations is located.

4. The computer-readable medium of claim 3,
   (a) wherein the alternative number representations comprise numerical digits representing units of money;
   (b) wherein at least one of the alternative number representations includes a unit of money symbol;
   (c) wherein at least one of the alternative number representations includes at least one comma between digits;
   (d) wherein at least one of the alternative number representations includes at least one period between digits; and
   (e) wherein at least one of the alternative number representations includes at least one space between digits.

5. The computer-readable medium of claim 4, wherein a specific ranking is assigned to the alternative number representations, and searches for the alternative number representations follow the assigned ranking.

6. The computer-readable medium of either of claims 1 or 2, having stored thereon instructions for performing the step of searching through the database to locate a source document containing the selected number which, when executed by the computer, cause the computer to search for the source document that has a date that is closest to the end of the 3-month quarter in which the selected number is reported by the target entity.

7. The computer-readable medium of either of claims 1 or 2, having stored thereon instructions for performing the step of searching through the database to locate a source document containing the selected number which, when executed by the computer, cause the computer to search for the source document that has a date that falls within a predetermined specified date range.

8. The computer-readable medium of either of claims 1 or 2, having stored thereon instructions for performing the step of searching through the database to locate a source document containing the selected number which, when executed by the computer, cause the computer to search for the source document that has a date that falls within at least one of the following date ranges:
   (a) a time period extending before and after the target entity's filing date for the source document containing the selected number,
   (b) a time period extending before the target entity's filing date for the source document containing the selected number; and
   (c) a time period extending after the target entity's filing date for the source document containing the selected number.

9. The computer-readable medium of claim 8, having stored thereon instructions which, when executed by the computer, cause the computer to determine which of two or more located documents has the most recent date if two or more documents are located having a date that falls within the date range.

10. The computer-readable medium of either of claims 1 or 2, wherein the financial information comprises financial numbers including dollar values, ratios and multiples.

11. The computer-readable medium of either of claims 1 or 2, wherein the financial information comprises financial numbers including Net Debt, Revenue, EBIDTA, EBIT, EPS and Book Value.

12. A computer-implemented method for locating and displaying a number in a source document comprising the steps of:
   (a) storing a database of financial information;
   (b) receiving a user selection entered on a computer of a target entity about which the user wishes to view financial information;
   (c) retrieving financial information of the target entity from the database of financial information;
   (d) displaying the retrieved financial information of the target entity;
   (e) receiving a user selection entered on a computer of a number within the displayed financial information;
   (f) searching through the database to locate a source document containing the selected number; and
   (g) displaying a portion of the source document containing the selected number.

13. A computer-implemented method for locating and displaying a number in a source document comprising the steps of:
(a) storing a database of financial information;
(b) receiving a user selection entered on a computer of a target entity about which the user wishes to view financial information;
(c) retrieving financial information of the target entity from the database of financial information;
(d) displaying the retrieved financial information of the target entity;
(e) receiving a user selection entered on a computer of a number within the displayed financial information;
(f) retrieving from the database one or more component numbers used to calculate the selected number, and displaying the component numbers;
(g) receiving a user selection entered on a computer of one of the component numbers;
(h) repeating steps (f) and (g) until the number selected by the user is a number contained in a source document and not calculated from two or more component numbers;
(i) searching through the database to locate a source document containing the selected number; and
(j) displaying a portion of the source document containing the selected number.

14. The computer-implemented method of either of claims 12 or 13, wherein the step of searching through the database to locate a source document containing the selected number comprises:
generating one or more alternative number representations for the selected number when no source document containing the selected number is found;
searching through the database to locate a source document containing at least one of the alternative number representations; and
stopping the search when a source document containing a one of the alternative number representations is located.

15. The computer-implemented method of claim 14:
(a) wherein the alternative number representations comprise numerical digits representing units of money;
(b) wherein at least one of the alternative number representations includes a unit of money symbol;
(c) wherein at least one of the alternative number representations includes at least one comma between digits;
(d) wherein at least one of the alternative number representations includes at least one period between digits; and
(e) wherein at least one of the alternative number representations includes at least one space between digits.

16. The computer-implemented method of claim 15, wherein a specific ranking is assigned to the alternative number representations, and searches for the alternative number representations follow the assigned ranking.

17. The computer-implemented method of either of claims 12 or 13, wherein the step of searching through the database to locate a source document containing the selected number comprises searching for the source document that has a date that is closest to the end of the 3-month quarter in which the selected number is reported by the target entity.

18. The computer-implemented method of either of claims 12 or 13, wherein the step of searching through the database to locate a source document containing the selected number comprises searching for the source document that has a date that falls within a predetermined specified date range.

19. The computer-implemented method of either of claims 12 or 13, wherein the step of searching through the database to locate a source document containing the selected number comprises searching for the source document that has a date that falls within at least one of the following date ranges:
(a) a time period extending before and after the target entity's filing date for the source document containing the selected number,
(b) a time period extending before the target entity's filing date for the source document containing the selected number; and
(c) a time period extending after the target entity's filing date for the source document containing the selected number.

20. The computer-implemented method of claim 19, wherein if two or more documents are located having a date that falls within the date range, the step of searching through the database to locate a source document containing the selected number further comprises determining which of the two or more documents has the most recent date.

21. The computer-implemented method of either of claims 12 or 13, wherein the financial information comprises financial numbers including dollar values, ratios and multiples.

22. The computer-implemented method of either of claims 12 or 13, wherein the financial information comprises financial numbers including Net Debt, Revenue, EBIDTA, EBIT, EPS and Book Value.

* * * * *